(12) United States Patent
Wappler et al.

(10) Patent No.: US 9,364,919 B2
(45) Date of Patent: Jun. 14, 2016

(54) APPARATUS AND METHOD FOR LASER DEPOSITION WELDING USING A POWDERY WELDING MATERIAL

(75) Inventors: Ronny Wappler, Dresden (DE); Steffen Nowotny, Radebeul (DE); Frank Brueckner, Dresden (DE); Siegfried Scharek, Dresden (DE); Robert Muenster, Hamburg (DE); Frank Kubisch, Dresden (DE); Holger Hillig, Bad Gottleuba (DE); Friedrich Kempe, Dresden (DE)

(73) Assignee: Fraunhofer-Gesellschaft Zur Foerderung Der Angewandten Forschung E.V., Munich (DE)

( * ) Notice: Subject to any disclaimer, the term of this patent is extended or adjusted under 35 U.S.C. 154(b) by 1019 days.

(21) Appl. No.: 13/088,499

(22) Filed: Apr. 18, 2011

(65) Prior Publication Data

US 2011/0259858 A1 Oct. 27, 2011

(30) Foreign Application Priority Data

Apr. 22, 2010 (DE) .......................... 10 2010 018 686

(51) Int. Cl.
*B23K 26/00* (2014.01)
*B23K 26/04* (2014.01)
*B23K 26/03* (2006.01)

(52) U.S. Cl.
CPC .............. *B23K 26/048* (2013.01); *B23K 26/032* (2013.01); *B23K 26/046* (2013.01); *B23K 26/144* (2015.10)

(58) Field of Classification Search
CPC .............. B23K 26/032; B23K 26/1411; B23K 26/048; B23K 26/046

USPC ............ 219/121.63, 121.78, 121.84, 121.47, 219/121.65; 427/596, 597; 118/641
See application file for complete search history.

(56) References Cited

U.S. PATENT DOCUMENTS

| | | | | |
|---|---|---|---|---|
| 4,804,815 A * | 2/1989 | Everett | ..................... | 219/121.66 |
| 6,316,744 B1 * | 11/2001 | Nowotny et al. | ......... | 219/121.84 |
| 6,744,005 B1 * | 6/2004 | Beyer et al. | .............. | 219/121.41 |
| 6,843,866 B2 * | 1/2005 | Brenner et al. | ............... | 148/525 |
| 2005/0040147 A1 * | 2/2005 | Hoebel et al. | ............ | 219/121.64 |
| 2006/0042436 A1 * | 3/2006 | Closmann | ......................... | 83/13 |
| 2006/0049153 A1 * | 3/2006 | Cahoon et al. | ........... | 219/121.63 |

FOREIGN PATENT DOCUMENTS

| | | |
|---|---|---|
| DE | 38 14074 A1 | 11/1989 |
| DE | 3814074 A1 * | 11/1989 |
| DE | 199 09 390 C1 | 11/2000 |
| DE | 19909390 C1 | 11/2000 |
| EP | 1 629 934 A1 | 8/2004 |
| JP | 01 040 194 A | 2/1989 |
| JP | 64-040194 | 10/1989 |

* cited by examiner

*Primary Examiner* — Thien S Tran
(74) *Attorney, Agent, or Firm* — Marshall & Melhorn, LLC

(57) ABSTRACT

An apparatus and method are provided for laser deposition welding of powdery welding material. The powdery welding material is conveyed via a nozzle coaxial with respect to a laser beam directed in a focused manner with a constant focal length onto a processing region through the nozzle onto the processing region. Optical elements are arranged in a laser optical unit for the shaping and guidance of the laser beam. The laser optical unit is attached to a processing head and can be moved with the processing head parallel to the laser beam by a first drive. The plane of the focal point can thereby be changed with respect to the surface. The nozzle can be moved independently of the laser optical unit parallel to the optical axis of the laser beam by a second drive.

11 Claims, 4 Drawing Sheets

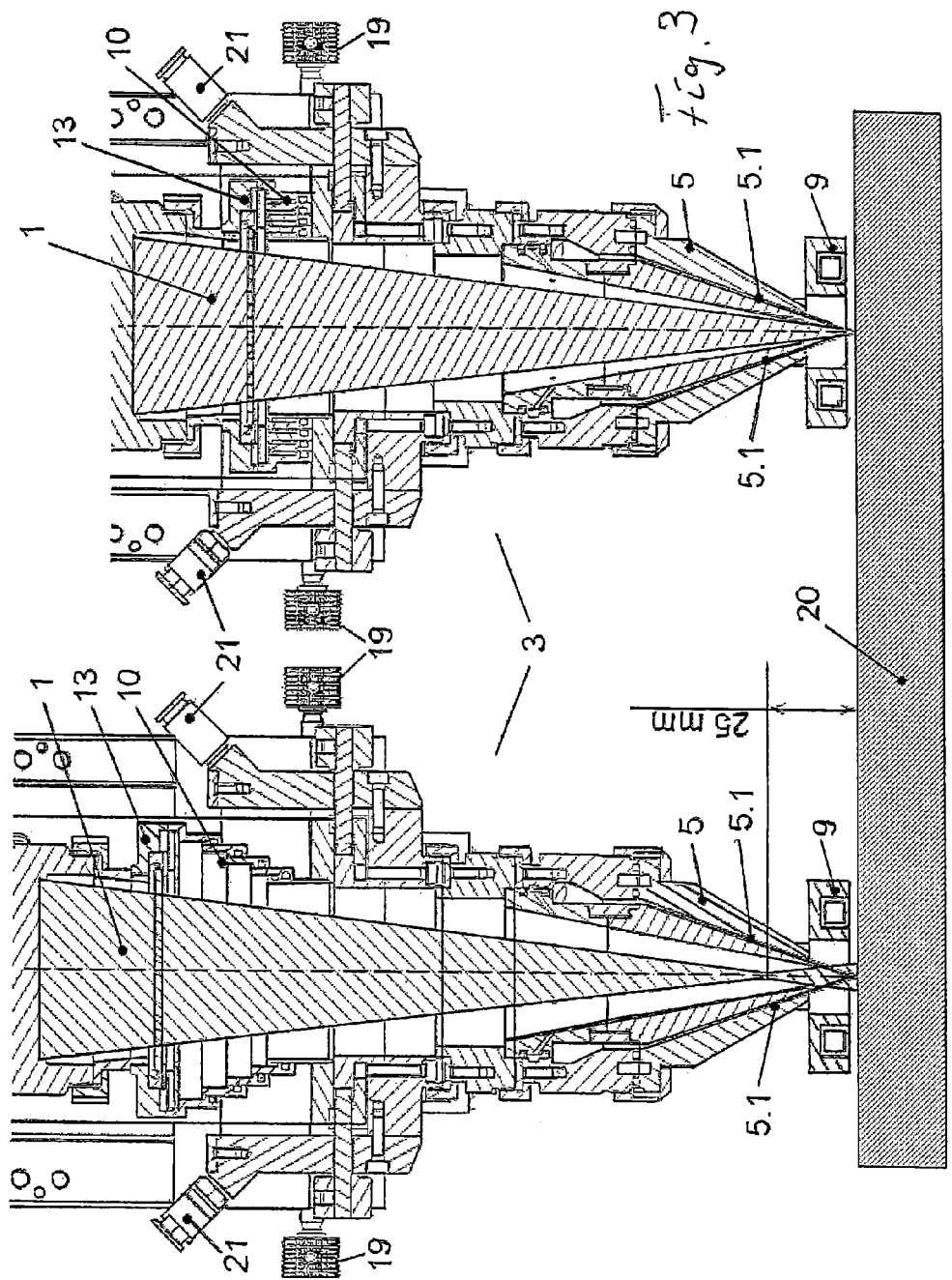

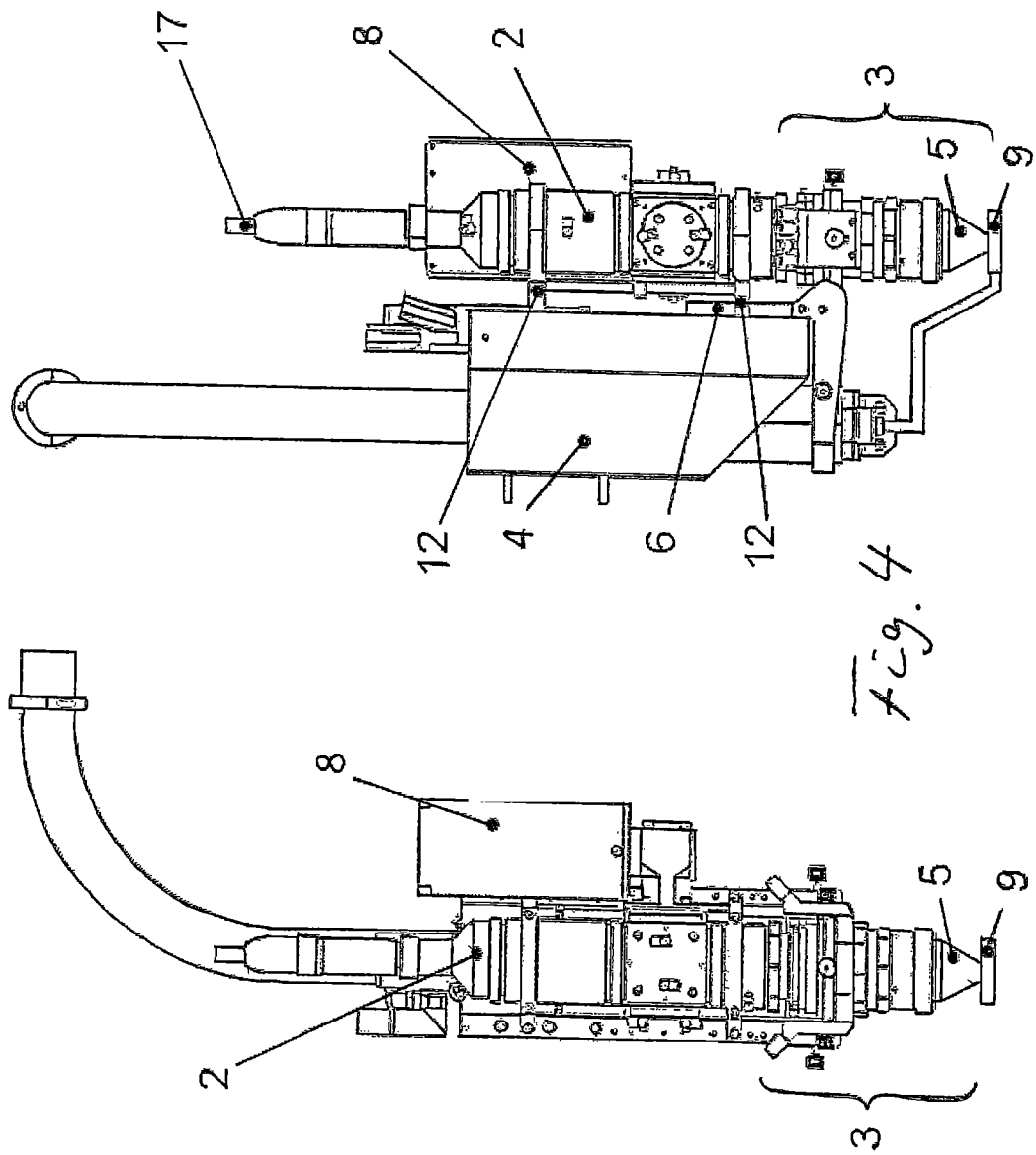

APPARATUS AND METHOD FOR LASER DEPOSITION WELDING USING A POWDERY WELDING MATERIAL

BACKGROUND OF THE INVENTION

The invention relates to an apparatus and to a method for laser deposition welding of powdery welding material. The invention can be used for the formation of wear protection or of other layers improving the properties of workpieces. A use is, however, also possible in a repair of worn workpieces.

The most varied welding materials can be processed.

The use of laser radiation for deposition welding has long been known and it is also frequently carried out in practice.

In this respect, it is not easily possible to use each of the known apparatus for laser deposition welding for every processing task and it is necessary to use especially designed apparatus. This increases the costs or disadvantages have to be accepted in the processing. The costs are in this respect influenced by the use of suitable laser optical systems which also allow a change in focus and/or collimation of the laser beam used and are called optical zoom systems. These optical systems are also still prone to disturbance.

A high productivity is also required in deposition welding and can be determined by a volume of deposited welding material which is as large as possible and in this respect is of a track width which is as large as possible. In this respect, however, limits are set by the workpiece material and the welding material. The melting temperatures are thus frequently in ranges which make the processing more difficult and it is thereby not possible to deposit a large volume in one workstep or to lay a wide track.

In addition, a good adhesion of the layer on the workpiece material has to be achieved and in so doing unwanted structural changes, a deep weld penetration, a pore formation and a crack formation should be avoided.

It is therefore the object of the invention to propose possibilities for laser deposition welding with increased flexibility and reduced costs, in particular for systems engineering.

SUMMARY OF THE INVENTION

This object is achieved in accordance with the invention by an apparatus having the features of claim 1. In this respect, it is also possible to work according to a method in accordance with claim 8. Advantageous embodiments and further developments of the invention can be realized using features designated in the subordinate claims.

In the invention, the powdery welding material is conveyed via a nozzle coaxial with respect to a laser beam directed in a focused manner with a constant focal length onto a processing region of a workpiece through the nozzle onto the processing region. Nozzles suitable for this purpose are known from the prior art. The welding material is in this respect supplied with a gas flow through passages and can be conveyed into the processing region via a ring-shaped outlet opening or a plurality of outlet openings arranged coaxially around a passage opening for the laser beam. The powdery material moves onto the machining region in a similar manner to the focused laser beam by the arrangement and alignment of the outlet opening and the passages. The thickness of the layer formed using the conveyed welding material and the size of the surface in the processing region provided with welding material can also be influenced by the respective spacing of the outlet opening(s) for the powdery welding material from the workpiece surface.

A plurality of optical elements are provided for the shaping and beam guidance of the laser beam which are statically arranged in a laser optical unit. This means that the position of the optical elements remains unchanged. In this respect, at least one optical element is present in the laser optical unit with which the laser beam is focused and is directed as such onto the processing region.

A plurality of different commercial laser optical units can be used in the invention. They include as a rule a collimator and then in the beam path downstream thereof a focusing optical element. A laser beam emitted by a laser beam source can advantageously be conducted through a suitable optical waveguide up to the laser optical unit. The connection can be established using plug connections. The laser beam exiting the optical waveguide in a divergent manner is incident onto the collimator and the then collimated laser beam is incident onto a focusing lens as a focusing element and is then conducted with a constant focal length in the direction of the workpiece surface. Different laser beam sources can be used with the apparatus in accordance with the invention.

The laser optical unit is attached to a processing head. This processing head can preferably be of a modular design, with explanations being provided in the following in this respect.

The respective laser optical unit can advantageously be replaceably fastened at the processing head via an adapter. The adapter can be designed for this purpose so that laser optical units of different manufacturers can be attached. A laser optical unit already anyway present at the user's can thus be used with the apparatus in accordance with the invention.

Since at least all optical elements of the laser optical unit are fixed, any required readjustment is not applicable.

The laser optical unit can be moved with the processing head parallel to the optical axis of the laser beam by a first drive. The position and the spacing of the plane of the focal point with respect to the workpiece surface and the size of the surface of the focal point in the processing region can thereby be changed.

In the invention, the nozzle can be moved independently of the laser optical unit, likewise parallel to the optical axis of the laser beam, by a second drive. A variation of the spacing of the outlet opening(s) of the nozzle from the workpiece surface is thereby possible. This results in a change of the welding material flow conveyed into the processing region adapted to the process as regards the track width of said welding material flow and the layer thickness of the powder. The conveyed powder quantity of welding material and the size of the focal point of the laser beam can thereby be adapted to one another, also while taking account of further parameters such as e.g. the welding material itself, optionally with its composition.

In addition, there is the possibility in this respect of correspondingly controlling or regulating the power of the laser beam source. The energy density can thereby be accordingly adapted to the size of the surface of the focal spot.

It is advantageous for a regulation to arrange a dichroic mirror in the beam path of the laser beam, with electromagnetic radiation being able to be directed onto an optical detector by said dichroic mirror so that an image of the processing region which is usable for a detection can be detected by the optical detector. Instead of a dichroic mirror, another optical element suitable for decoupling a portion of the emitted electromagnetic radiation can also be used. A CCD camera can, for example, be used as an optical detector. It is particularly advantageous to use an optical detector with which a contactless temperature measurement with a small time constant and a largest possible spatial resolution is possible.

To counteract the problem of the pore formation and crack formation, the formation of structural changes and adhesion problems and to increase the deposition rate, an inductor connected to an electric AC generator can be attached to the second drive and/or to the nozzle. This inductor can then be moved not only in accordance with the two-dimensional x-y feed movement of the apparatus, but also in the z axis direction. A spacing which is favorable for the inductive heating of the workpiece material can thereby be set or maintained between the workpiece surface and the inductor, which is in particular favorable in the processing of three-dimensional workpiece surfaces.

The fastening of the inductor should ensure its replaceability. An adaptation of the inductor used to the respective materials and workpieces can thereby be achieved. In this respect, an inductor can be designed so that it preheats the workpiece material which is conveyed in the direction of the feed axis before the processing region into the powdery welding material. An inductor can, however, also be used which additionally or solely allows a longer maintaining of elevated temperatures subsequent to the already processed processing region, that is, in a region in which a deposition of welding material has already taken place.

In any case, on the use of an inductor, the required laser power can be reduced since the material of the workpiece and, by thermal conduction, also the welding material can be preheated.

In the invention, laser optical units having constant focal lengths differing from one another can be used.

A telescopic cover and/or a replaceable extension tube can be arranged between the laser optical unit and the processing head with a nozzle. Such an arrangement is also possible in another alternative between an element of the processing head and the nozzle. An adaptation to the different lengths or spacings can be achieved with at least one of these elements. With its free inner diameter, an extension tube can also take account of the respective cross-section of the focused laser beam and prevent an incidence of laser radiation onto its inner wall A protection in the interior of the apparatus with a changeable length can be achieved using a telescopic cover.

Since a replacement of laser optical units should be possible with the invention, it is advantageous to provide a two-dimensional adjustment apparatus for the alignment of the laser optical unit at the processing head.

The invention allows a high flexibility in laser deposition welding, which applies to the use of the most varied materials, the processing of different workpieces. The laser radiation used can be utilized effectively with simple means and can be adapted to the respective supplied powder flow of the welding material which can be changed by adjusting the spacing of the nozzle with outlet openings to the workpiece surface in the processing region. The supplied powdery welding material can be utilized more effectively for the deposition and powder losses can be reduced.

The processing can be carried out in any desired, also constantly changing, feed axis directions, which is in particular possible by the coaxial supply of the welding material around the laser beam.

The movement of the laser optical unit with the processing head and the movement independently thereof of the nozzle parallel to the optical axis of the laser beam can take place using a linear drive or also using a manually actuable drive.

BRIEF DESCRIPTION OF THE DRAWINGS

The invention will be explained in more detail by way of example in the following.

There are shown:

FIG. 3 two sectional representations through a processing head which can be used with the invention; and FIG. 4 two views of an example of an apparatus in accordance with the invention.

DETAILED DESCRIPTION OF THE INVENTION

Figure 1:
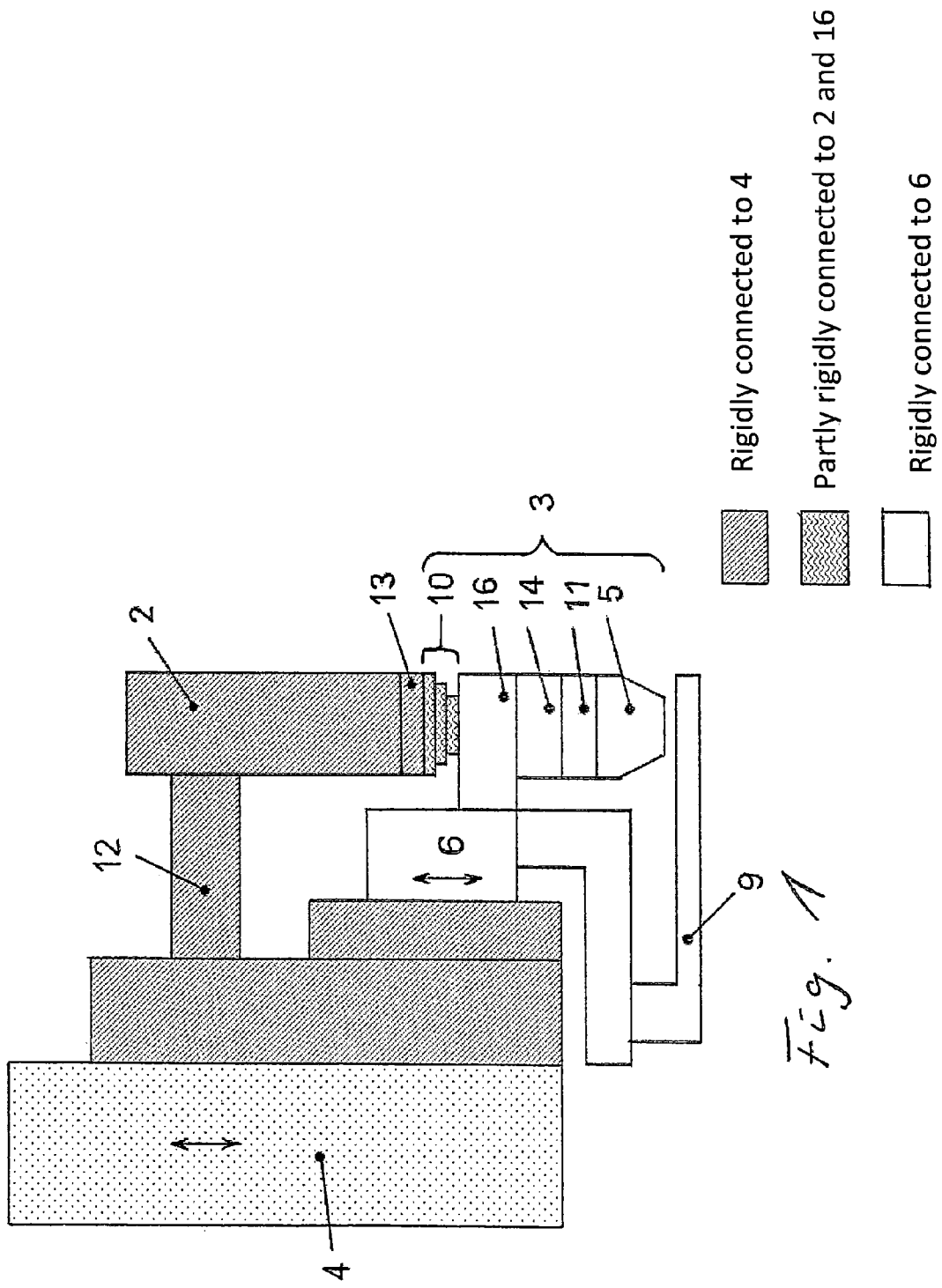
FIG. 1 in schematic form, the design of an example of an apparatus in accordance with the invention.

FIG. 1 schematically shows the design of an example of an apparatus in accordance with the invention. In this respect, a laser optical unit 2 is connected via a suitable holder 12 to the first drive 4 and to the processing head 3. A replaceable protective glass cassette 13 for the protection of the optical elements can be attached to the laser optical unit 2 in the interior of the laser optical unit 2 between the processing head 3 and the laser optical unit 2.

A telescopic cover 10 as a further protective element is present subsequent thereto in the direction of the nozzle 5.

It is followed by the processing head 3 made in modular form from a plurality of elements. A two-dimensional adjustment device 16 for the alignment of the laser optical unit 2 and of the processing head 3 with respect to one another, a unit for the introduction of the process media 14, an extension tube 11 and the nozzle 5 are present at the processing head 3. Extension tubes having different lengths, outer diameters and inner diameters can be used with the invention.

The whole, that is, the laser optical unit 2 and the total processing head 3 with the nozzle 5 can be moved to and fro in the z axis direction by the drive 4, which is illustrated by the double arrow at the drive 4.

In this example, a second linear drive 6 is present at which the total processing head 3 with the nozzle 5 fastened thereto can be moved additionally and independently of the laser optical unit 2 parallel to the optical axis, of the laser beam 1 not shown here which is likewise indicated by the double arrow at the drive 6. The spacing of the nozzle 5, with the outlet openings formed thereon for the powdery welding material, from the surface of the workpiece 20 can be adjusted using this drive 6. In this respect, the laser optical unit 2 can be held immobile in one position. The different spacings between the laser optical unit 2 and the processing head 3 can be bridged using the telescopic cover 10.

In this example, an inductor 9 is connected to the second drive 6 and can thus be moved with the processing head and the nozzle 5 so that its spacing from the workpiece surface can also be adjusted together with the nozzle 5. The holder of the inductor 9 or the inductor 9 itself can be designed so that a simple and fast replacement of inductors 9 is possible.

In a form not shown, an apparatus in accordance with the invention can, however, also be designed so that the laser optical unit 2 can be moved together with the processing head 3 by the first drive 4. The second drive then only moves the nozzle 5 and only the spacing from the workpiece surface and the nozzle 5 is changed by the drive 6. In this case, a telescopic cover 10 can be arranged between the processing head 3 and the nozzle 5. Only the supply for the welding material and a conveying gas as well as optionally a coolant to the nozzle 5 have to be adapted flexibly in this region or to the changing spacing between the processing head 3 and the nozzle 5.

For the two-dimensional adjustment apparatus 16, two screws 19 can be used, in conjunction with sliding elements, said screws in each case engaging from oppositely disposed sides and being able to be rotated manually to align with respect to one another the laser optical unit 2 and the processing head 3 with the opening of the nozzle 5 by which the laser beam 1 is directed to the processing region.

Figure 2:
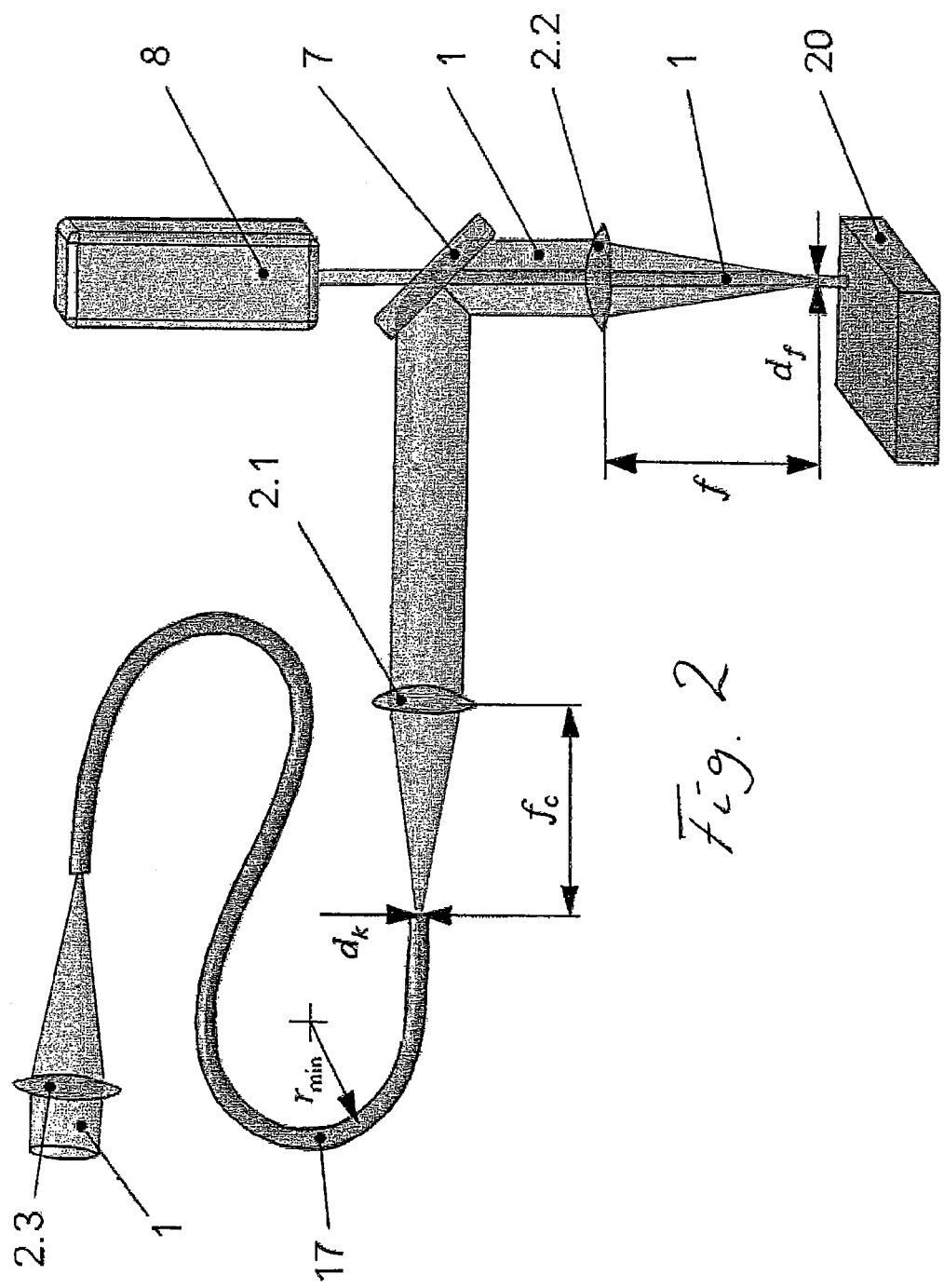
FIG. 2 in schematic form, the design of a laser optical unit which can be used with the invention.

The structure of a laser optical unit 2 such as can be used with the invention is shown schematically in FIG. 2. In this respect, laser radiation of a laser beam source, not shown, is coupled via a focusing lens 2.3 into an optical waveguide 17 and is radiated via the latter into the laser optical unit 2. The divergent laser beam 1 emerging from the optical waveguide 17 is incident onto a collimator 2.1. The collimated, widened laser beam 1 is reflected by a dichroic mirror 7 by 90° in the direction of the surface of the workpiece 20 and is incident onto a focusing lens 2.2 by which the laser beam 1 is directed with a constant focal length dependent on the focusing lens 2.2 used onto the workpiece surface in the processing region. In the representation, the focal point plane is above the workpiece surface so that a focal spot is present in the processing region having a larger surface than would be the case with a correspondence of the workpiece surface and the focal point plane.

Electromagnetic radiation emitted by the surface of the processing region and reflected from there can be incident onto the dichroic mirror 7 again through the focusing lens 2.2 in the opposite direction to the laser beam 1. The electromagnetic radiation having the wavelengths for which the dichroic mirror 7 is transparent, are incident onto the CCD camera, as an optical detector 8, and at least some of the processing region is imaged there for a monitoring and regulation of the processing. In the simplest case, in this respect, a spatially resolved temperature measurement can be carried out which can be utilized for a regulation of the power with which the laser beam 1 is directed to the processing region and/or of the position of the focal point plane and/or of the spacing of the nozzle 5 from the workpiece surface. A regulation of the volume flow of supplied welding material can also be carried out.

In contrast to the representation of FIG. 2, the laser beam 1 can also be directed in a straight line onto the workpiece surface in an optical axis without deflection at the dichroic mirror 7. For this purpose, only the radiation emitted and reflected by the processing region is reflected by the mirror 7 and, deflected by 90°, directed to the then correspondingly arranged optical detector 8.

In FIG. 3, two sectional representations through a processing head 3 are shown in which different positions of the focal point plane of the laser beam 1 have been adjusted with the aid of the first drive 4, not shown here.

The laser beam 1 exiting in a focused manner from the laser optical unit 2, likewise not shown in FIG. 3, moves through the free cross-section of the individual elements forming the processing head 3 and through the nozzle 5 in the processing region onto the surface of the workpiece 20. In the left hand representation, the focal point plane is 25 mm above the workpiece surface and in the right hand representation, the focal point plane and the workpiece surface coincide.

A protective glass cassette 13 is arranged at the very top of the processing head 3 and is followed by the telescopic cover 10. The latter is compressed in the right hand representation due to the shorter length and is drawn apart in the left hand representation. An extension tube 11 (not shown) can follow as the next element.

Two regulating screws 19 with which an adjustment in an axis direction x or y can be carried out are also shown in the two representations. Two further regulating screws 19 aligned at 90° thereto and not recognizable in this representation can be utilized for the adjustment in the respective other axis direction y or x.

In addition, connections 21 for a media supply are shown. Powdery welding material, protective gas or coolant can be conducted through them. In this respect, more than the shown connections 21 can also be present for respective different media.

It can also be recognized in the representations that passages 5.1 are formed in the nozzle 5 through which powdery welding materials can be conveyed into the processing region, optionally with a conveying gas flow. The passages 5.1 are obliquely inclined at an angle with respect to the optical axis of the laser beam 1 so that welding materials can be supplied in a focused manner from a plurality of sides coaxially about the focal spot of the laser beam.

An inductor with whose aid the workpiece material can be heated in the region of the processing region is arranged around the processing region and around the focal spot.

In the two positions shown in FIG. 3, only the position of the focal point plane was changed with the aid of the first drive 4. The spacing of the nozzle 5, and consequently also the spacing of the outlet openings for powdery welding material from the passages 5.1, from the workpiece surface has remained unchanged so that the angular relationships of the outflowing welding material have remained the same. Only the size of the surface of the focal spot has been changed in this respect.

Two views of an example of an apparatus in accordance with the invention are shown in FIG. 4. In this respect, a laser optical unit 2 to which an optical waveguide 17 is connected is fastened by a fastening holder 12 to a drive 4 which is made as a linear drive. The laser optical unit 2 is moreover connected to the processing head 3 which is of modular structure and to which the nozzle 5 is attached in the direction of a workpiece 20, not shown.

The processing head 3 is in this respect supported in a vertical guide which is present at the drive 4. Parallel to this, a second drive 6 is attached there with which the total processing head 3 can likewise be moved parallel to the optical axis of the laser beam 1. This movement can be carried out decoupled from the movement of the laser optical unit 2. There is the possibility to move the laser optical unit 2 together with the processing head 3 in translation, for which the drive 4 is used. Once the respective position of the focal point plane of the focused laser beam 1 suitable for a desired processing has been reached, the drive 4 can be switched off and the laser optical unit 2 can be held stationary.

If the drive 6 is activated, the processing head 3 can be moved accordingly. The spacing of the nozzle 5 from the workpiece surface can thereby be adjusted and the conveying of the powdery welding material into the processing region can be directly influenced.

It can also be recognized that electromagnetic radiation can be directed from the processing region perpendicular to the side and to the optical axis of the laser beam 1 by a dichroic mirror 7, not recognizable here, into the optical detector 8 onto a CCD camera for the monitoring of the process.

What is claimed is:

1. An apparatus for laser deposition welding using a powdery welding material which is directed to a processing region of a workpiece via a nozzle coaxial with respect to a laser beam focused with a constant focal length directed onto the processing region through the nozzle onto the processing region, in this regard comprising a plurality of optical elements statically arranged in a laser optical unit for forming and beam guidance of the laser beam, wherein the laser optical unit is attached to a processing head, the laser optical unit is movable with the processing head parallel to the optical axis of the laser beam by a first drive, the laser beam defines an optical axis, a focal point which focal point defines a plane, and the workpiece has a surface, which is of a set size, whereby the plane of the focal point can be changed with respect to the workpiece surface and the size of the focal point on the surface in the processing region, and the nozzle is movable independently of the laser optical unit parallel to the optical axis of the laser beam by a second drive, wherein the second drive changes only the spacing from the workpiece surface and the nozzle.

2. The apparatus in accordance with claim 1, wherein the laser beam defines a beam path, and a dichroic mirror is arranged in the beam path of the laser beam, with electromagnetic radiation being able to be directed onto an optical detector by said dichroic mirror so that an image of the processing region is detected by the optical detector.

3. The apparatus in accordance with claim 1, wherein an inductor connected to an electric AC generator is attached to the second drive and to the nozzle.

4. The apparatus in accordance claim 3, wherein the laser optical unit and the inductor are replaceably fastened.

5. The apparatus in accordance with claim 1, wherein a telescopic cover and a replaceable extension tube are arranged between the laser optical unit and the processing head.

6. The apparatus in accordance with claim 1, wherein a two-dimensional adjustment device for alignment of the laser optical unit is present at the processing head.

7. The apparatus in accordance with claim 1, wherein the laser beam emitted by a laser beam source is conducted to the laser optical unit through an optical waveguide.

8. The apparatus in accordance with claim 1, wherein an inductor connected to an electric AC generator is attached to the second drive or to the nozzle.

9. The apparatus in accordance claim 8, wherein the laser optical unit or the inductor is replaceably fastened.

10. The apparatus in accordance with claim 1, wherein a telescopic cover or a replaceable extension tube is arranged between the laser optical unit and the processing head.

11. An apparatus for laser deposition welding using a powdery welding material which is directed to a processing region of a workpiece via a nozzle coaxial with respect to a laser beam focused with a constant focal length directed onto the processing region through the nozzle onto the processing region, in this regard comprising a plurality of optical elements statically arranged in a laser optical unit for forming and beam guidance of the laser beam, wherein the laser optical unit is attached to a processing head, the laser optical unit is movable with the processing head parallel to the optical axis of the laser beam by a first drive, the laser beam defines an optical axis, a focal point which focal point defines a plane, and the workpiece has a surface, which is of a set size, whereby the plane of the focal point can be changed with respect to the workpiece surface and the size of the focal point on the surface in the processing region, and the nozzle is movable independently of the laser optical unit parallel to the optical axis of the laser beam by a second drive, wherein the laser beam defines a beam path, and a dichroic mirror is arranged in the beam path of the laser beam, with electromagnetic radiation being able to be directed onto an optical detector by said dichroic mirror so that an image of the processing region is detected by the optical detector, an inductor connected to an electric AC generator is attached to the second drive and to the nozzle, and the second drive changes only the spacing from the workpiece surface and the nozzle.

* * * * *